US012744395B2

(12) United States Patent
Szekeres et al.

(10) Patent No.: US 12,744,395 B2
(45) Date of Patent: Sep. 22, 2026

(54) METHOD AND APPARATUS TO SUPPLY DC POWER WITH VARIABLE VOLTAGE

(71) Applicant: Christopher Cooper Riddle, Solana Beach, CA (US)

(72) Inventors: Jackson Dening Szekeres, Solana Beach, CA (US); Callum George McCall, San Diego, CA (US); Trey Daniel Riddle, San Diego, CA (US); Chloe Chia Chi Chiu, San Diego, CA (US); Miles Ethan Krawitz, San Diego, CA (US); Sophia Hu, San Diego, CA (US)

( * ) Notice: Subject to any disclaimer, the term of this patent is extended or adjusted under 35 U.S.C. 154(b) by 721 days.

(21) Appl. No.: 18/336,852

(22) Filed: Jun. 16, 2023

(65) Prior Publication Data

US 2024/0421609 A1 Dec. 19, 2024

(51) Int. Cl.

| | |
|---|---|
| ***H01R 13/453*** | (2006.01) |
| ***H02J 1/08*** | (2006.01) |
| ***H02J 7/42*** | (2026.01) |
| ***H02J 7/47*** | (2026.01) |
| ***H02J 7/70*** | (2026.01) |
| ***H02J 7/80*** | (2026.01) |

(52) U.S. Cl.

CPC ................ *H02J 7/47* (2026.01); *H02J 1/084* (2020.01); *H02J 7/42* (2026.01); *H02J 7/731* (2026.01); *H02J 7/80* (2026.01)

(58) Field of Classification Search

CPC ...... H02J 7/47; H02J 1/084; H02J 7/42; H02J 7/731; H02J 7/80

See application file for complete search history.

(56) References Cited

U.S. PATENT DOCUMENTS

| | | | | |
|---|---|---|---|---|
| 2009/0096413 | A1* | 4/2009 | Partovi | H02J 50/005 320/108 |
| 2012/0235636 | A1* | 9/2012 | Partovi | H01F 38/14 320/108 |
| 2019/0097448 | A1* | 3/2019 | Partovi | H01F 38/14 |
| 2019/0125455 | A1* | 5/2019 | Shelton, IV | A61B 5/00 |

* cited by examiner

*Primary Examiner* — Abdullah A Riyami
*Assistant Examiner* — Nelson R. Burgos-Guntin

(57) ABSTRACT

The smart DC outlet and plug system described in this patent aims to revolutionize power distribution by improving efficiency and safety compared to traditional AC outlets. By supporting variable DC voltage, integrating safety features, enabling demand control, and utilizing Power Line Communication for connectivity, the system offers a more advanced solution for powering devices. The smart outlet employs plug identification to determine the priority level and required voltage of the plugged-in device and then sets it to that level. Since DC electricity is produced by solar and used in batteries, by transitioning the in-home power distribution to DC, power is not lost converting from DC to AC and back to DC. Additionally, the outlet includes safety features not found in AC outlets. A power meter box or other central controller can deactivate less critical devices, enabling fine-grain demand control as a better alternative to rolling blackouts.

8 Claims, 2 Drawing Sheets

METHOD AND APPARATUS TO SUPPLY DC POWER WITH VARIABLE VOLTAGE

BACKGROUND OF THE INVENTION

For over 100 years the standard AC (alternating current) power distribution system in buildings and outlet design has remained essential unchanged. AC power is the most common form of electrical power for long-distance transmission and distribution in homes and buildings. AC power was chosen because high voltage (around 500 kV) is most efficient for long-distance transmission and AC power can be converted to high voltage efficiently using simple step-up transformers. Lower voltage (110-220V) is used for distribution in homes and buildings for safety reasons.

However over time, more devices use DC (direct current) power including computers, TVs, phones, electric vehicles, high efficiency air conditioners, and the list is growing. With AC power distribution, this means that every device that uses DC power needs to convert from AC to DC. This conversion is usually done by an AC adapter which are often bulky and always come with an efficiency loss as AC power cannot be converted to DC power with 100% efficiency.

Also over time, more buildings have available DC power on site either from solar panels or batteries. The growing demand for renewable power generation has driven the adoption of solar panels on buildings and parking areas. The DC power generated by solar panels can be used by devices that use DC power. Batteries can be used to store power generated from solar panels when not needed or to store AC power from the grid when the cost is low and then used from the battery when the grid power cost is high.

With more devices in buildings using DC power and with DC power available on site from solar or batteries, it motivates the use of DC power distribution in buildings. With AC power distribution in buildings, the DC power from solar or batteries first needs to be converted to AC, typically done with an inverter, distributed in the building, then converted from AC back to DC to power the devices which use DC power. The conversion loss from DC to AC and back to DC depends on many factors but is on the order of 20%. Therefore direct DC power distribution in buildings can avoid this 20% power loss. Our invention allows for generated or stored DC power to be distributed and directly used by devices without ever incurring the power loss converting to/from AC.

U.S. Pat. No. 7,641,477B2 describes an electromagnet connector for electronic devices. Electromagnets consist of a soft metal core made into a magnet by the passage of electrical current through it. Our invention differs from this prior art because it does not require an electromagnet to make the connection.

Patent application WO2002052703A1 describes a wall mounted DC current outlet receptacle. The invention is an outlet receptacle for providing a fixed low voltage DC current in the wall of a stationary structure where the structure has been wired to provide AC house current. Our invention differs from this prior art in a number of ways. First, our invention supports buildings that use DC power distribution. Second, our invention uses plug identification to set the device DC voltage according to the needs of the device instead of forcing the devices to use the fixed DC voltage provided. There are other differences including the enablement of a fine-grain demand control policy.

SUMMARY OF THE INVENTION

Our invention is a smart receptacle and plug system to supply DC power with variable voltage. The system has two main components: the receptacle and the plug. The plug contains a plug identification module which can be read by the receptacle. The plug identification contains information including both the required DC voltage of the device and the priority level of the device. The receptacle uses the required DC voltage information to supply the required voltage and uses the priority level to determine when power should be supplied to the device.

The plug contains a plug identification module which allows the receptacle to read information about the plug's device such as priority level and required voltage. The plug contains four electrical contacts representing Positive, Negative, Ground and Information to supply power as well as to provide an interface to communicate through the Information wire. The plug also contains magnets to allow a physical connection to the receptacle.

The receptacle contains a digital compute device, a power line communication module, a fixed voltage regulator module, and a variable voltage regulator module. The digital compute device takes the plugged in device priority level and required voltage from the plug identification module. The power line communication module allows data to be sent over power lines. The fixed voltage regulator module provides voltage to the digital compute device allowing it to perform its necessary tasks. The variable voltage regulator module receives the device's required voltage from the digital compute device and then provides it.

Devices that use DC power today have varied voltage requirements. Phone chargers have used 5V but newer ones support 28V, 36V, and 48V. Even higher voltages may be used by phone chargers in the future. High power electronics like air conditioners may require 110V or 220V. So there is a need to convert a fixed DC voltage distributed in the building to the voltage each device requires. Our invention enables the receptacle to supply just the voltage the plugged-in device requires, eliminating the need for devices to perform the voltage conversion.

Our invention learns the required device voltage using plug identification and then delivers that voltage using a DC-to-DC converter. The DC-to-DC conversion can be accomplished using a high efficiency switching regulator. The plug identification can be accomplished in a number of ways. One way to implement plug identification is to measure the value of a resistor in the plug which corresponds to required voltage and priority level. Another way to implement the plug identification is to use a 1-Wire protocol to communicate with a 1-Wire module in the plug. The 1-Wire technology is a serial protocol using a single data line plus ground reference for communication. Either way, the plug identification requires a wire which we call the Information wire.

Our DC power plug invention electrical interface has some common elements of the existing AC power plug interface. AC power plugs typically have two or three wires: Positive, Return (or Neutral), and optionally Ground (P,N, G). Our invention adds one additional Information wire for the purpose of plug identification. So our DC power plug interface uses four wires: Positive, Negative, Ground, and Information (P,N,G, and I).

DETAILED DESCRIPTION OF THE INVENTION

Figure 1:
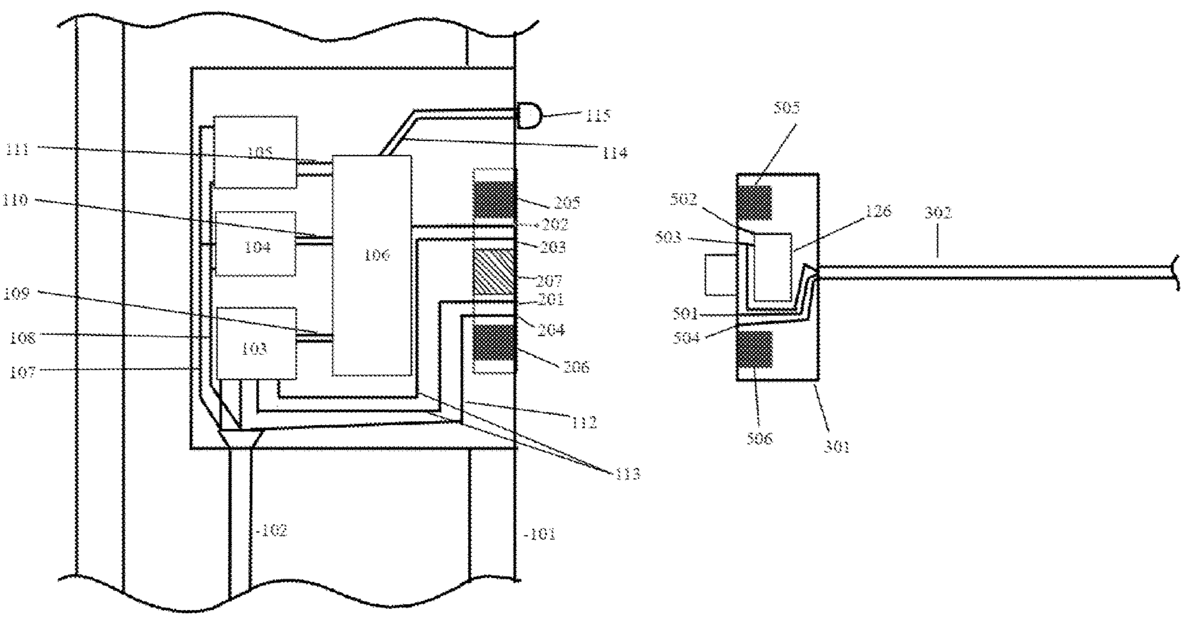
FIG. 1 shows the smart outlet receptacle and plug. The receptacle is connected on one side to the main power supply. The main power supply has a nominal DC voltage and uses the same wiring as the legacy AC power supply. A corresponding electrical plug connects to the other side of the receptacle. The connection is aided by magnets to ensure proper orientation and to secure the plug to the receptacle.
Figure 2:
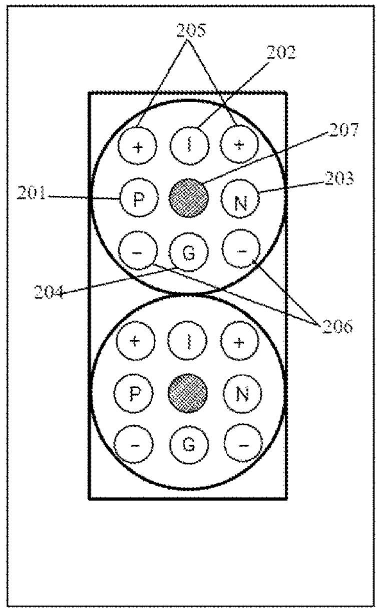
FIG. 2 shows the front view of an outlet with two receptacles.
Figure 3:
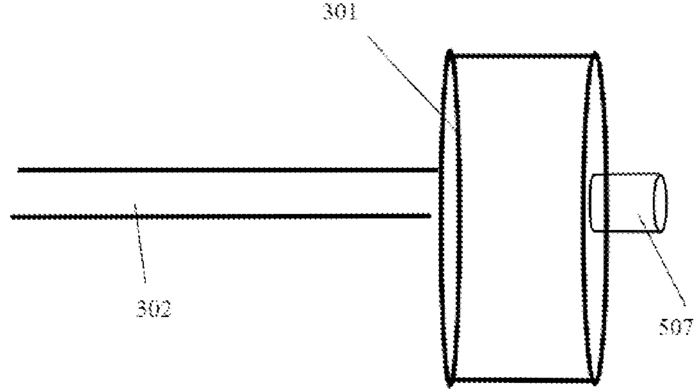
FIG. 3 shows the side view of the plug.
Figure 4:
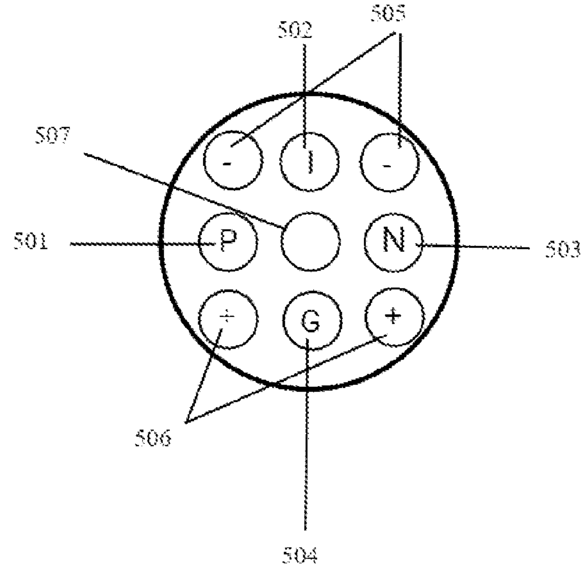
FIG. 4 shows the front view of a plug.

In its preferred embodiment, the present inventive concept pertains to an in-wall outlet system and associated compatible plug. Other embodiments include extension cords, power strips and any other way the current AC power outlets are used. Referring to FIG. 1, the preferred embodiment is a power receptacle and compatible plug 301.

The plug 301 includes magnets (505 and 506) for proper alignment to the receptacle magnets (205 and 206). The plug includes four electrical connections including Information 502, Neutral 503, Power 501 and Ground 504. When the plug is brought in close proximity to the receptacle, the magnets snap the plug into alignment with the receptacle. To help maintain the alignment, each plug 301 has an extruding cylindrical piece 507 which fits into a corresponding intruding cylindrical hole 207 in the receptacle.

The phrase 'connecting surface,' refers to a specific portion of the plug 301 and/or a specific portion of the receptacle. The connecting surface of the plug shall be defined as the area of the plug 301 containing electrical contacts (501, 502, 503, 504), and any of the material of the plug 301 which is in the same plane as the electrical contacts and will physically touch the receptacle when the plug and receptacle are properly connected. The plug's connecting surface also contains the parts of the magnets (505, 506) which touch the receptacle. The receptacle's connecting surface shall be defined as containing the material of the receptacle including electrical contacts (201, 202, 203, 204), and any other area of the receptacle which would physically contact the connecting surface of the plug 301.

Four magnets (205, 206), across the receptacle's connecting surface, mirrored by four magnets (505, 506) across the plug's connecting surface, are placed in such a way to prevent accidental disconnection. The two magnets 205 across the receptacle's connecting surface located on either side of the Information 502 contact have their South magnetic poles facing the plug 301, and the magnets 206 located on either side of the Ground 504 have their North magnetic poles side facing the plug 301. The polarity of the magnets (205, 206, 505, 506) are arranged such that there is only one possible orientation of the plug 301 in which the magnetic connection will allow the plug to be secured to the receptacle, in order for the plug's Power 501, Neutral 503, Ground 504, and Information 502 to only connect to their corresponding electrical contacts on the receptacle when the plug 301 is properly oriented.

The specific arrangement of the South and North poles may be reversed or inverted without departing from the scope of the invention.

Once the plug is aligned, the Neutral 503 is electrically connected to the Neutral 203 on the receptacle, the Power 501 is electrically connected to the Power 201 on the receptacle, the Ground 504 is electrically connected to the Ground 204 on the receptacle, and the Information 502 is electrically connected to the Information 202 on the receptacle. When the Neutral and Power contacts are connected, electricity can flow to the device through a Wire 302

Within the plug, the information 502 wire is connected to a plug identification module 126. In the preferred embodiment, the plug identification module 126 consists of a 1-wire standard compatible module. A 1-wire device has no pin for power supply as it takes energy from the 1-wire bus (parasitic supply). The 1-wire device simply needs to contain the plug identity information which can be stored as a 64-bit value, readable over the 1-wire interface. The 64-bit value communicates the requested DC voltage and the device priority level. In another embodiment, the plug identification module 126 consists of a single resistor which has a different resistance value for each requested DC voltage and device priority level combination.

The receptacle contains four modules, a digital compute device module 106, a fixed voltage regulator module 105, a power line communication module 104, and a variable voltage regulator module 103. When a compatible plug is connected to the receptacle, the digital compute device reads the plug identification module information and with that information, determines the device priority level and the device required voltage.

In it's preferred embodiment, the receptacle contains a LED 115 connected to the Digital Compute Device via a pair of Wires 114. The LED indicates if the priority level of the plugged-in device is high enough to receive power.

It is common for different DC devices to require different voltages. For example, a phone charger might require 5 volts, a laptop charger might require 20 volts, and higher powered devices like an air conditioner might require 120 volts. This is a significant difference from AC powered devices which may all generally take 110V in the United States. Therefore with DC power there is a need to supply different voltages to different devices.

In its preferred embodiment three priority levels are used, levels one, two, three. In it's preferred embodiment priority level one is dedicated to devices that are unknown or used for comfort, priority level two is dedicated to devices that are deemed essential but not used for emergency medical purposes, priority level three is reserved for emergency medical devices. At any given time a minimum priority level is applied. If the device priority level is less than the minimum priority level then the device is given 0 Volts (powered off). Therefore, if the minimum priority level is four, then all devices are powered off.

The digital compute device 106 learns the minimum priority level from the powerline communication device number 104. Powerline communication is a technology that enables the transmission of data and communication signals over existing power lines alongside the standard power supply.

The minimum priority level is set by a central controller. In one embodiment it is a device connected by the user to another receptacle within the house. In another embodiment it is a utility company that can enforce the demand control system, meaning that the priority level communication can be set by the utility smart meter.

If the connected device has a priority level less than the minimum as set by the central controller, the output voltage is configured to zero volts. If the priority of the connected device is equal to or greater than the minimum, the digital compute device 106 then communicates with the variable voltage controller to provide the necessary voltage to the device through the positive and negative wires 113 to the plug.

The fixed voltage regulator 105 provides fixed voltage power to the digital compute device 106, which allows 106 to perform its necessary tasks. In another embodiment, 105 and 106 are combined and it is not necessary to have two separate parts.

There are three wires coming into the present device from a home's Main Wire 102 as follows: Positive, Negative, and Ground from the in-building wiring system. The ground wire is a pass through that goes to 204 through wire 112, the Positive and Negative connect to 103, 104, and 105, through the wires 107 and 108.

The invention claimed is:

1. A power receptacle providing variable DC voltage comprising: a. a configurable voltage regulator able to generate a plurality of output voltages from a fixed input DC voltage from a home main wire; b. four electrical connections including a positive, information, neutral, and ground electrical contacts arranged across a power receptacle connecting surface; c. four magnets arranged across the power receptacle connecting surface, a pair of two with south polarity on either side of the information electrical contact and a pair of two with north polarity on either side of the ground electrical contact to secure an electrical plug to the power receptacle and align the respective conductive electrical contacts; d. a digital compute device which stores a minimum priority level and is configured to read a plug identification module stored information to determine a required DC voltage and a priority level; e. supplying the required DC voltage through the positive and neutral electrical connections if the priority level not less than the minimum priority level and supplying zero volts otherwise.

2. The power receptacle of claim 1, wherein the voltage regulator is a buck switching regulator.

3. The power receptacle of claim 1, further comprising a communications module to communicate the minimum priority level information over a home main wire.

4. The power receptacle of claim 3, wherein the communications module uses powerline communications.

5. An electrical plug comprising: a. four electrical connections including positive, information, neutral, and ground electrical contacts arranged across an electrical plug connecting surface; b. four magnets arranged across the electrical plug connecting surface, a pair of two with north polarity on either side of the information electrical contact and a pair of two with south polarity on either side of the ground electrical contact to secure the to align and secure the electrical plug to a power receptacle and align the respective conductive electrical contacts; c. The plug identification module integrated in the electrical plug and electrically coupled to the information electrical contact storing a plug identification module stored information.

6. The electrical plug of claim 5, wherein the plug identification module stored information is stored as a resistive value.

7. The electrical plug of claim 5, wherein the plug identification module stored information is stored as a 64-bit value.

8. A system of grid-level power demand control using a power receptacle, an electrical plug, and a central controller, the system comprising:

a. the power receptacle having a power receptacle connecting surface including a positive, information, neutral, and ground electrical contacts;

b. the electrical plug having an electrical plug connecting surface including a positive, information, neutral, and ground electrical contacts;

c. the power receptacle having four magnets arranged across the power receptacle connecting surface, a pair of two with south polarity on either side of the information electrical contact and a pair of two with north polarity on either side of the ground electrical contact to secure the electrical plug to the power receptacle and align the respective conductive electrical contacts;

d. the electrical plug having four magnets arranged across the electrical plug connecting surface, a pair of two with north polarity on either side of the information electrical contact and a pair of two with south polarity on either side of the ground electrical contact;

e. the power receptacle having a configurable voltage regulator able to generate a plurality of output voltages from a fixed DC voltage from a home main wire;

f. the electrical plug having a plug identification module stored information; and the power receptacle having a stored minimum priority level;

g. the power receptacle being configured to read the plug identification module stored information from a connected electrical plug and to determine a priority associated with the electrical plug based on the plug identification module stored information;

h. the central controller configured to transmit an updated minimum priority level to the power receptacle through the home main wiring;

i. the power receptacle having a communications module configured to receive the updated minimum priority level from the central controller through the home main wiring and to update the stored minimum priority level;

j. the power receptacle which compares the priority associated with the electrical plug to the stored minimum priority level and supplies zero volts if the priority associated level is less than the minimum priority level.

* * * * *